United States Patent [19]

Menard

[11] 4,327,618

[45] May 4, 1982

[54] APPARATUS FOR CUTTING A STRIP OF MATERIAL

[76] Inventor: Harvey Menard, 21125 Bothell Way, Bothell, Wash. 98011

[21] Appl. No.: 764,193

[22] Filed: Jan. 31, 1977

[51] Int. Cl.$^3$ .............................................. B26D 3/00
[52] U.S. Cl. ...................................... 83/468; 83/561; 83/581; 83/694; 83/917
[58] Field of Search ................. 83/467, 481, 694, 917, 83/561, 635, 581, 468

[56] References Cited

U.S. PATENT DOCUMENTS

| | | | | |
|---|---|---|---|---|
| 1,531,287 | 3/1925 | Jensen | ................................ | 83/917 X |
| 1,745,815 | 2/1930 | Schoepfle | ......................... | 83/561 X |
| 2,207,370 | 7/1940 | Bayley | ............................... | 83/581 X |
| 2,555,069 | 5/1951 | Verney | .............................. | 83/559 X |
| 3,299,759 | 1/1967 | Johnson et al. | .................... | 83/917 X |

FOREIGN PATENT DOCUMENTS 644696  1/1964  Belgium ................................ 83/581

*Primary Examiner*—James M. Meister
*Attorney, Agent, or Firm*—Thomas W. Secrest

[57] ABSTRACT

There is disclosed a method and an apparatus for providing decorative material in the form of strips. These strips may be applied to window panes in order to give the appearance of leaded windows. A work guide and adjustable work stop are mounted on a ring which rotates around a die and cooperating reciprocating cutter. By adjustment of the stop and of the ring the strip material may be placed against the guide and stop and cut to the desired length and angle.

5 Claims, 13 Drawing Figures

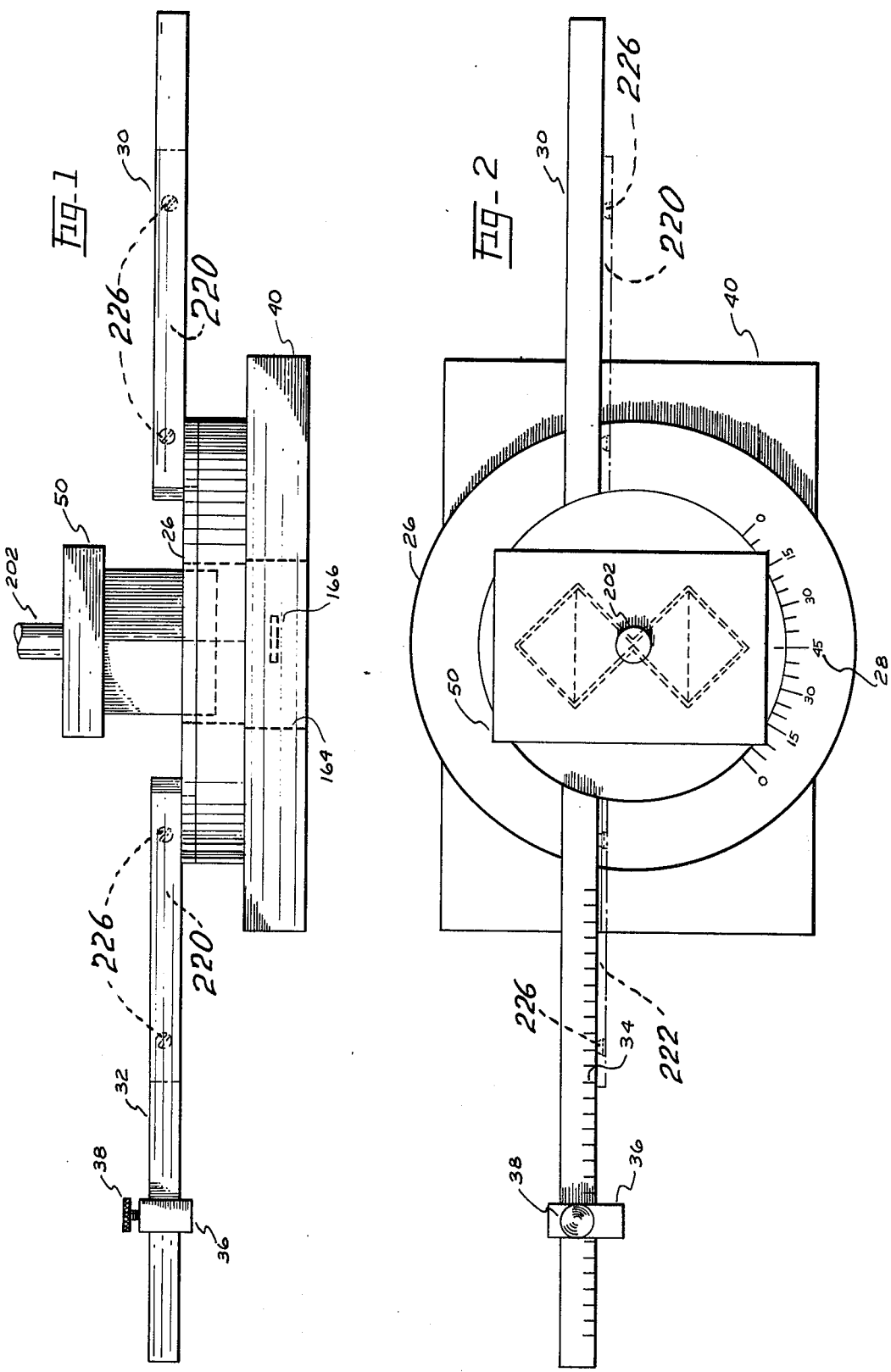

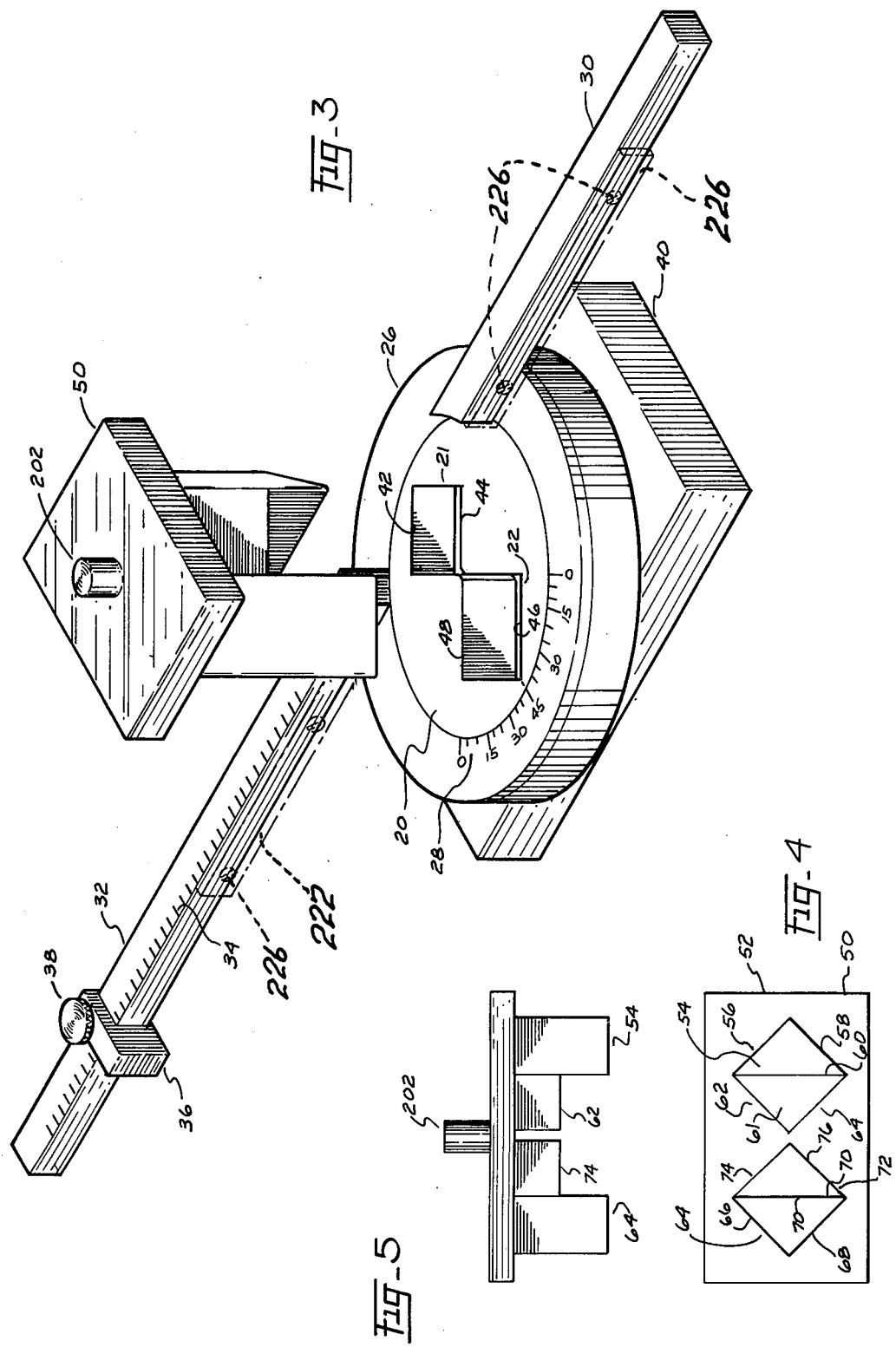

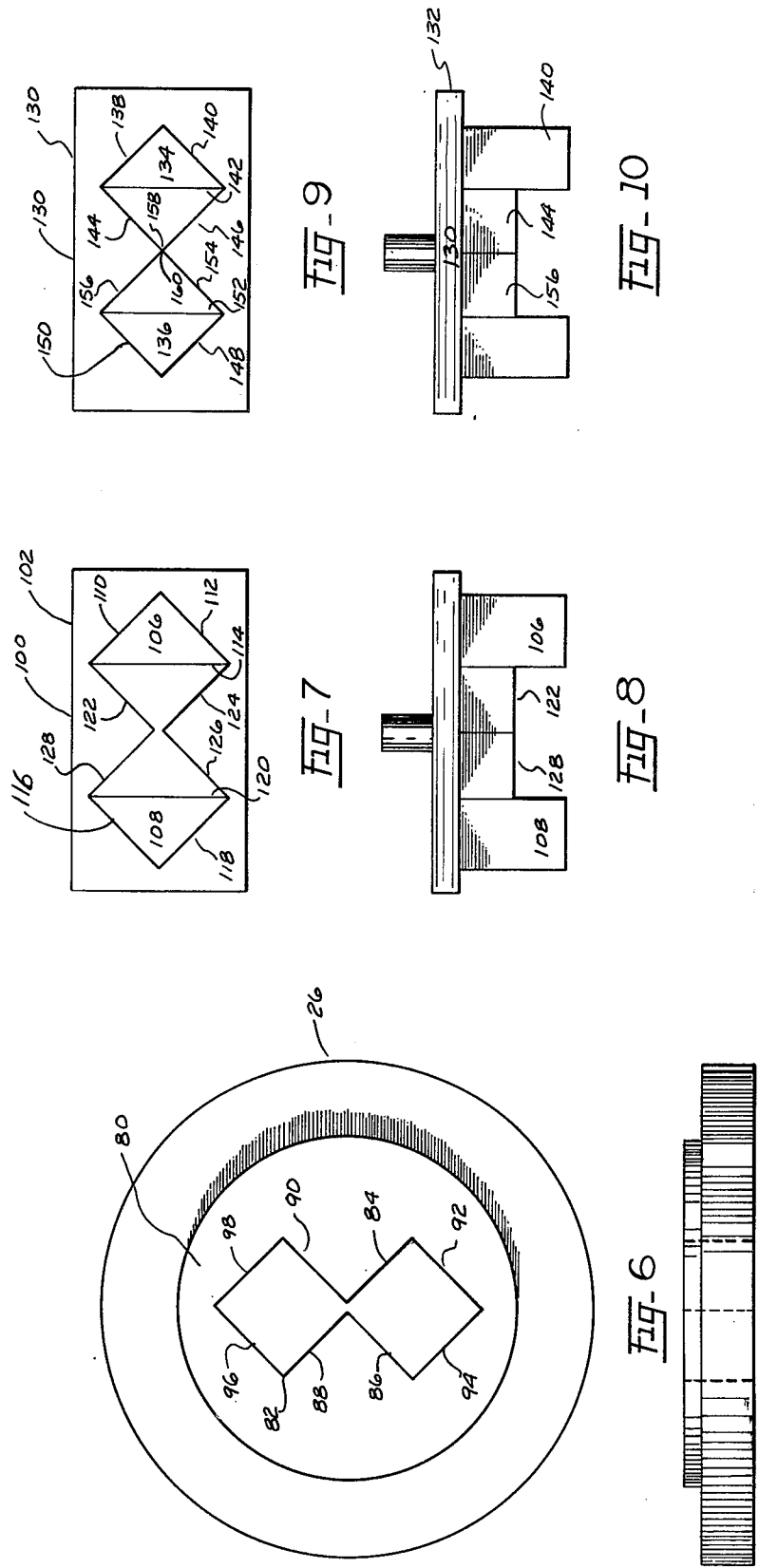

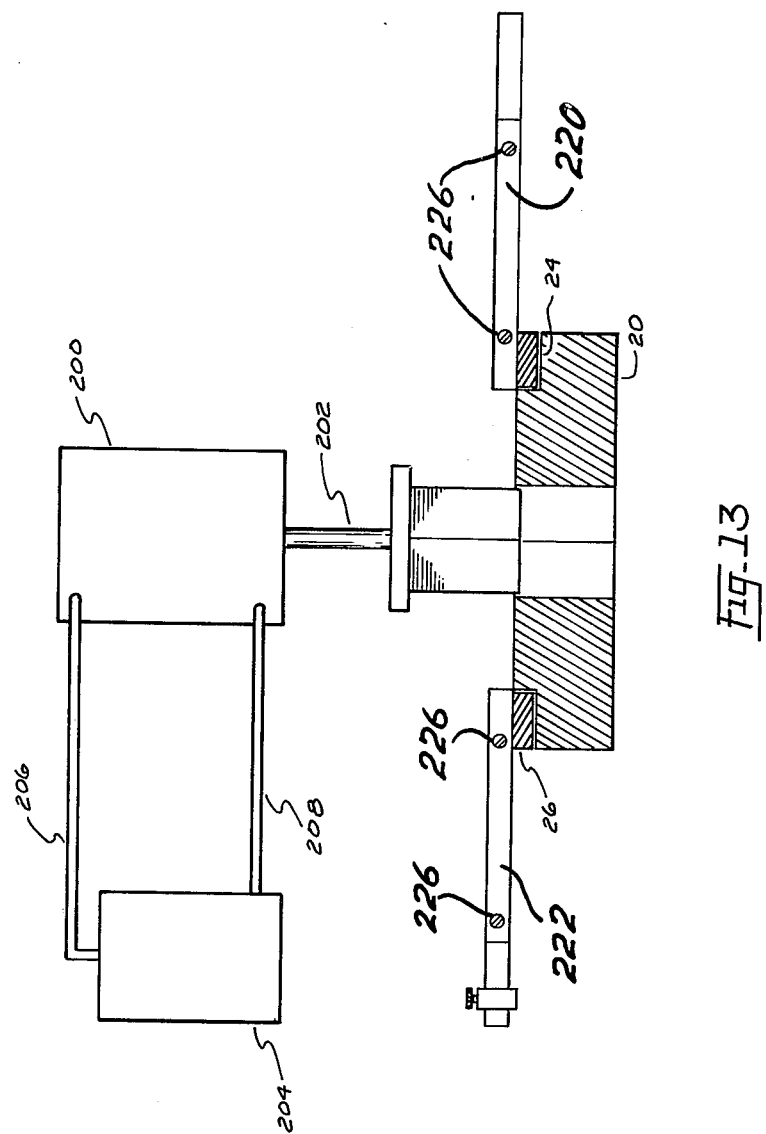

APPARATUS FOR CUTTING A STRIP OF MATERIAL

THE GENERAL BACKGROUND OF THE INVENTION

At one time leaded windows were popular and many home owners wanted the attractive and decorative windows. The cost of preparing these leaded windows, even by hand, was, relatively, inexpensive.

In time, leaded windows lost their appeal to the public and in place of leaded windows there are used clear windows. As a result, few leaded windows were made and the artisans capable of making leaded windows grew older and retired. As there was little demand for leaded windows, younger artisans were not trained and there were, relatively, few artisans capable of making leaded windows.

In the last few years, leaded windows have regained popularity and favor among home owners but there are, relatively, few artisans capable of making the leaded windows. Further, the cost of making leaded windows by hand is expensive and, to many home owners, is therefore prohibitive. There has been developed a substitute for leaded windows and one form of this substitute is a strip of material which is cut to the proper length and whose ends are cut to the correct angles. This strip of material can be adhered to the window pane so as to give the appearance of a decorative leaded window. A person walking on a sidewalk or driving an automobile on the street can observe the window with the decorative strip material and draw the conclusion that the window is a simulated leaded window.

THE GENERAL DESCRIPTION OF THE INVENTION

The invention comprises an apparatus which makes it possible to readily process a piece of strip material to form a processed strip material of the desired length and having the correct angle on the ends. An individual can operate this apparatus and fill an order for the required amount of the processed strip material for attaching to the panes of a window.

The strip material may be metal or plastic, such as a strip of aluminum or a strip of plastic or a strip of lead. There may be applied to the back of the strip material an adhesive or the strip material may come to the manufacturer of the processed strip material with an adhesive backing so that after the processed strip material has been made, the adhesive backing can be exposed for attaching the processed strip material to a window.

THE OBJECTS AND THE ADVANTAGES

A main object of this invention is to process strip material to form a processed strip material of a desired length with its ends having the correct angles for decorative use; another important object is to provide an inexpensive process to make a processed strip material for decorative use for simulated leaded windows; an additional and important object is to provide an inexpensive apparatus for making a processed strip material of desired length and whose ends are of correct angles for decorative use; an additional object is to provide a process and apparatus for making a processed strip material which process and apparatus requires, only, a short training period to use the apparatus and to learn the process for processing the strip material; an additional object is to provide a quick and easy process for cutting strip material to the desired length and with the ends at the correct angles; another important object is to provide an apparatus for making the processed strip material and which apparatus requires, substantially, no maintenance.

These and other important objects and advantages of the invention will be more particularly brought forth upon reference to the specific description of the invention, the appended claims, and the accompanying drawings.

THE DRAWINGS

FIG. 1 is a front elevational view of a specific embodiment of the invention;

FIG. 2 is a top plan view of the invention;

FIG. 3 is a perspective view of the invention and illustrates the plunger removed from the die;

FIG. 4 is a bottom plan view of the plunger;

FIG. 5 is a side elevational view of the plunger of FIG. 4;

FIG. 6 is a top plan view of the die;

FIG. 7 is a bottom plan view of another species of the plunger;

FIG. 8 is a side elevational view of the plunger of FIG. 7;

FIG. 9 is a bottom plan view of a third species of the plunger;

FIG. 10 is a side elevational view of the plunger;

FIG. 13 is a schematic illustration of the apparatus including the powering means for raising and lowering the plunger with respect to the die.

THE SPECIFIC DESCRIPTION OF THE INVENTION

Figure 11:
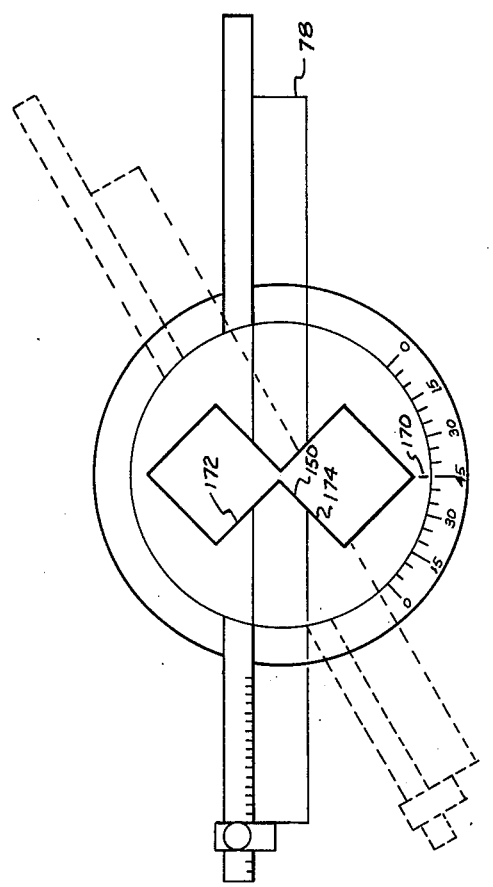
FIG. 11 is a plan view illustrating use of the apparatus for processing strip material to make a processed strip material of the desired length and with the ends of the correct angles.

With reference to the drawings and, in particular, FIG. 3, it is seen that the invention comprises a die 20 having two recesses 21 and 22. The upper outer portion of the die 20 is stepped at 24, as illustrated in FIG. 13, for receiving a circular ring 26 having indicia 28. The ring 26 can rotate around the die 20. Also, there is mounted on the ring 26 a guide having a right part 30 and a left part 32. On the left part 32, there is indicia 34 to indicate the distance from the recess 21 and the recess 22. Also, on the left part 32, there is a movable stop 36. The movable stop 36 has a tightening screw 38 for definitely positioning the stop 36 on the left part 32.

Underneath the die 20 there is a support table 40.

In FIG. 3, it is seen that the first recess 21, in a plan view, is in the configuration of a square and, also, that the second recess 22, in a plan view, is in the configuration of a square.

The first recess 21 has a first side 42 and a second side 44. The angle between the first side 42 and the second side 44 is about 90°.

The second recess 22 has a third side 46 and a fourth side 48. The angle between the third side 46 and the fourth side 48 is about 90°. The junction of the first side 42 and the second side 44 is positioned close to the junction of the third side 46 and the fourth side 48. The angle between the second side 44 and the third side 46 is about 90°, and the angle between the first side 42 and the fourth side 48 is about 90°. It is to be noted that in the die 20 that the recess 21 is distinct and separate from the recess 22 and that there are two recesses in the die 20.

There is a plunger 50 having a base 52. The plunger 50 has a first depending guide 54 which, in FIG. 4 appears to be in the configuration of an isosceles triangle having a first side 56 and a second side 58 and a base 60. There is a depending cutting member having a first cutting edge 62 and a second cutting edge 64. The cutting member 61 also appears to be in the configuration of an isosceles triangle having a base 60. The cutting member 61 is not as long as the first depending guide 54 or may be considered to be recessed with respect to the guide 54.

The plunger 50 also has a second depending guide 64 in the configuration of an isosceles triangle having a side 66 and a side 68 and a base 70. There is a cutting member 72 in the configuration of an isosceles triangle having a cutting edge 74, a cutting edge 76, and a base 70. The second guide 64 is longer than the cutting member 72 or, the cutting member 72 may be considered to be recessed with respect to the guide 74.

The junction of the cutting edges 62 and 74 is spaced apart from the junction of the cutting edges 74 and 76 although these cutting edges are close together.

The guide 54 moves in the first recess 21 and the guide 64 moves in the second recess 22. Also, the cutting member 61 moves in and out of the first recess 21 and the cutting member 72 moves in and out of the second recess 22.

The guides 54 and 64 can be in the recesses 21 and 22 with the cutting members 61 and 72 out of the recesses and with the strip 78 between the cutting members and the die 20. Then, when the cutting members 61 and 72 are moved into the recesses 21 and 22, the strip material 78 is severed or cut as illustrated in FIG. 11.

In FIG. 6, there is illustrated a die 80 having a recess 82. The recess 82 has a first side 84, a second side 86, a third side 88, and a fourth side 90. The angle between the first side 84 and the second side 86 is about 90°. The angle between the third side 88 and the fourth side 90 is about 90°. The angle between the second side 86 and the third side 88 is about 90°. The angle between the first side 84 and the fourth side 90 is about 90°.

In FIG. 6, it is seen that the recess 82 resembles two squares meeting at the junction of the first side 84 and the second side 86 and also meeting at the junction of the third side 88 and the fourth side 90 so that there is a passageway between the two squares.

The first side 84 meets with the side 92 and the second side 86 meets with the side 94. The sides 92 and 94 meet with each other to complete one square and the angle between the sides 92 and 94 is about 90°. The third side 88 meets with the side 96 and the fourth side 90 meets with the side 98. The sides 96 and 98 meet with each other at a junction and the angle between the sides 96 and 98 is about 90°.

The plunger 50 can be used with the die 80 as well as with the die 20.

There is a plunger 100 having a base 102 and a depending guide 104. The depending guide 104 has two long, depending members 106 and 108. The guide portion 106 has a first side 110, a second side 112, and a base 114. The sides 110 and 112 and the base 114, see FIG. 7, appear to be in the configuration of an isosceles triangle. The second guide portion 108 has a first side 116, a second side 118, and a base 120. The sides 116 and 118, and the base 120, see FIG. 7, appear to be in the configuration of an isosceles triangle. In FIG. 8, it is seen that the guide portions 106 and 108 are relatively long and are designed to fit into the recess 90 in the die 80.

The plunger 100 also comprises a plurality of cutting edges. There is a first cutting edge 122 and a second cutting edge 124. In FIG. 7, it is seen that the cutting edges 122 and 124 in conjunction with the base 114 give the appearance of a modified isosceles triangle. There is a third cutting edge 126 and a fourth cutting edge 128. In FIG. 7, it is seen that the cutting edges 126 and 128 in conjunction with the base 120 give the appearance of a modified isosceles triangle. The angle between the first cutting edge 122 and the second cutting edge 124 is about 90°. The angle between the third cutting edge 126 and the fourth cutting edge 128 is about 90°. The angle between the second cutting edge 124 and the third cutting edge 126 is about 90°. The angle between the first cutting edge 122 and the fourth cutting edge 128 is about 90°. It is seen in FIG. 7, that the first cutting edge 122 and the second cutting edge 124 unite and are, essentially, continuous. Similarly, the second cutting edge 124 and the third cutting edge 126 unite and are, essentially, continuous. In FIG. 8, it is seen that the cutting edges are recessed with respect to the guide portions 106 and 108 or that the guide portions 106 and 108 are longer than the cutting edge portions. The guide portions 106 and 108 can be in the recess 90 while the cutting edges are out of the recess 90 so that a piece of strip material 78 can be between the cutting edges and the die 80 for forming into the processed strip material.

With respect to FIGS. 7 and 8, it is seen that the depending guide 104 is unitary with respect to the guide portions 106 and 108 and the cutting edges 122, 124, 126, and 128.

The plunger 100 is used with the die 80.

In FIGS. 9 and 10, there is illustrated a plunger 130 having a base 132.

The plunger 130 comprises a first guide and cutting member 134 and a second guide and cutting member 136.

The first guide and cutting member 134, on the guide part, see FIG. 9, has a first side 138, a second side 140, and a base 142, generally, in the configuration of an isosceles triangle. The cutting portion of member 134 has a first cutting edge 144, a second cutting edge 146, a base 142, generally, in the configuration of an isosceles triangle.

The first member 134 has a first cutting edge 144 and a second cutting edge 146 and which cutting edges in conjunction with the base 142 give the appearance, generally, of an isosceles triangle.

The second member 136 has a third side 148 and a fourth side 150 and a base 152 which, in FIG. 9, give the appearance of an isosceles triangle. The second member 136 has a third cutting edge 154 and a fourth cutting edge 156 which edges in conjunction with the base 152 give the appearance of an isosceles triangle.

In FIG. 9, it is seen that the angle between the first cutting edge 144 and the second cutting edge 146 is about 90°. The angle between the third cutting edge 154 and the fourth cutting edge 156 is about 90°. The angle between the second cutting edge 146 and the third cutting edge 154 is about 90°. The angle between the first cutting edge 144 and the fourth cutting edge 156 is about 90°.

In FIG. 10, it is seen that of the member 134, the guide portion comprising the sides 138 and 140 is longer than the cutting portion comprising the cutting edges 144 and 146. Likewise, of the member 136, the guide portion comprising the sides 148 and 150 is longer than the cutting edge part comprising the cutting edges 154 and 156. In FIG. 10, it is seen that the cutting edge parts are recessed with respect to the guide parts. In effect, the guide parts can be in the recess 90 of the die 80 with the cutting edges not in the recess 90 so that a strip material 78 can be between the cutting edges and the die 80.

The member 134 is distinctive separate from the member 136. In FIG. 9, it is seen that the cutting edges 144 and 146 form a junction 158. The cutting edges 154 and 156 form a junction 160. The junctions 158 and 156 are juxtapositioned but are distinct and separate.

The plunger 130 can be used with the die 80.

In FIG. 3, there is illustrated a plunger with depending guides separated from the corresponding die.

In FIG. 1, a side elevational view of the apparatus, it is seen that the plunger is positioned with respect to the die so that the guides of the plunger are in the recesses of the die but the cutting edges of the plunger are not in the recesses of the die.

Further, it is seen that in support table 40 that there is a passageway 164 to allow severed pieces 166 of the strip material 78 to fall away from the die and the plunger.

In FIG. 2, a plan view of the apparatus, there is illustrated the plunger and guide positioned with respect to the die for severing strip material 78 to the desired length and the ends to the correct angles.

In FIG. 11, there is illustrated the apparatus, without the plunger, so as to illustrate the position of the strip material 78 with respect to the recesses in the die. In FIG. 11, there is illustrated, in solid line, the strip material 78 positioned on both the left part 32 of the guide and the right part 30 of the guide prior to being severed. It is seen that the movable stop 36 is set at the correct position for the desired length. Also, with the indicia on the ring 36 set opposite the indicia 170 on the die, the angle of cutting the ends of the strip material 78 to the correct angle has been determined. In this instance, the ends of the strip material 78 are to be formed having a first side 172 and a second side 174. The angle between the first side 172 and the second side 174 is 90°. It is seen that the indicia 28 on the ring 26 is set so that the reading is 45° with respect to the mark 170 on the die.

In FIG. 11, see the strip material 78 in broken line, the ring 26 and the guides 30 and 32 have been rotated with respect to the die so that the angle 30 is opposite the indicia 170 on the die. The ends of the strip material then are cut to have different angles, such as 30° and a 60° angle.

Figure 12:
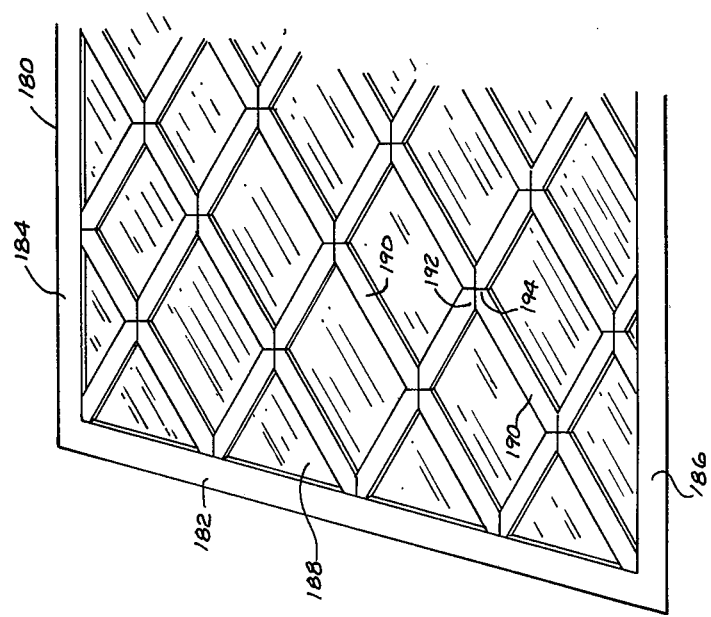
FIG. 12 is an axonometric view illustrating the processed strip material as applied to a pane of a window to give the appearance of a simulated leaded window.

In FIG. 12, there is illustrated a window 180 having a style portion 182 and two rail portions 184 and 186.

The window also has a pane of glass 188.

It is seen that the processed strip material 190 has ends 192 and 194 with the correct angles so that in laying the processed strip material 190 onto the glass 188, there is arranged a square pattern of the processed strip material 190.

The processed strip material 190 may be placed on one side of the window glass 188 or may be placed on both sides of the window glass 188.

From experience, I have found that anodized aluminum is a satisfactory strip material 78. Also, this anodized aluminum may have an integral adhesive protected by a sheet material. After the processed strip material 190 has been formed, a person applying the strip material to the window glass 188 can remove the protective sheet material so as to expose the adhesive and then can adhere the processed strip material 190 to the window glass 188. An alternative is for the strip material 78 to be formed into the processed strip material 190 and then an adhesive placed on the strip material 190 and the strip material 190 adhered to the window pane 188.

In FIG. 13, there is illustrated the apparatus with the die, rotatable rings and guides, and the plunger. The plunger may be hydraulically operated. For example, there can be a fluid operated cylinder 200 having a ram 202. There is a pump and motor combination 204 having one lead-in line 206 connecting with the cylinder lead-in line 208 connecting with the cylinder 200. The operator of the apparatus can select the desired length and angle to which the strip material 78 is to be cut. Then, the strip material can be placed between the plunger and the die and the cylinder actuated so as to force the guides of the plunger and the cutting edges into the recesses of the die for forming the strip material 78 into the processed strip material 190.

The strip material may be of various widths. For example, the strip material may be ¾" in width or may be ½" in width. For the narrower strip material, it is necessary to place a spacer strip 220 on the right part 30 and a spacer strip 222 on the left part 32. The right part 30 and the left part 32, for example, without the spacer strip may accommodate a ¾" wide strip material. To accommodate a ½" wide strip material it is necessary to use a spacer strip ⅛" in thickness. The spacer strips 220 and 222 have two passageways 224. The right part 30 and the left part 32 have two drilled tapped holes aligned with the passageways 224. It is possible to attach the spacer strip 220 to the right part 30 and the spacer strip 222 to the left part 32 by means of bolts 226. With the use of these spacer strips, it is possible to accommodate various widths of strip material so as to achieve different effects with respect to decorative windows and simulated lead windows.

I consider my invention to be new in that it comprises a die, a plunger, and a calculating means for the correct length of strip material to be processed and also for forming the strip material into the correct angle.

It consider the invention to be useful as with this invention it is possible for people to, inexpensively, have simulated leaded windows to add to the appearance and decorative effect of windows. In many instances, many people are pleased with an attractive house or building with decorative windows. In this instance, inexpensive, simulated lead windows are useful and add to the value of the building and the house.

I consider my invention to be unobvious as I do not know of another apparatus having such a calculating means for determining, with respect to a die and plunger, the desired length of a strip material to be processed and also for forming the ends of the strip material into the correct angle. In addition, I do not know of a die having two recesses in, essentially, two square or diamond patterns for receiving a plunger having similar guide and cutting edges. To the best of my knowledge, this is the only apparatus of its kind as I have not seen other similar pieces of equipment and do not know of other similar pieces of equipment. For these reasons, I consider this invention to be unobvious in view of my knowledge of the state of the art.

From the foregoing and having presented my invention, what I claim is:

1. A machine for processing strip material to a desired length and the ends of the strip material to desired angles to realize processed strip material, said machine comprising:
   a. a severing means;
   b. a length positioning means for positioning said strip material with respect to said severing machine for processing said strip material to said desired length;
   c. an angle positioning means for positioning said strip material with respect to said severing machine for processing the ends of said strip material to desired angles;
   d. said severing machine and said strip material being rotatable with respect to each other to form said strip material into said processed strip material;
   e. said plunger having a guide means and a cutting edge for moving in said recess;
   f. said plunger being longer than said cutting edge so that said cutting edge is recessed with respect to said plunger;
   g. said plunger can be in said recess and said cutting edge can be positioned apart from said die with sufficient clearance between said die and said cutting edge to allow said strip material to be placed between said plunger and said cutting edge;
   h. said die in a cross-sectional view presenting a first recess and a second recess;
   i. said first recess having a first side and a second side;
   j. said first side and said second side meet at a first edge;
   k. the angle between said first side and said second side being about 90°;
   l. said second recess having a third side and a fourth side;
   m. said third side and said fourth side meet at a second edge;
   n. the angle between said third side and said fourth side being about 90°;
   o. said first edge and said second edge being juxtapositioned to each other;
   p. the angle between said first side and said fourth side being about 90°;
   q. the angle between said second side and said third side being about 90°;
   r. said die having a first cutting edge, a second cutting edge, a third cutting edge, and a fourth cutting edge;
   s. the angle between said first cutting edge and said second cutting edge being about 90°;
   t. said first cutting edge and said second cutting edge forming a first junction;
   u. the angle between said third cutting edge and said fourth cutting edge being about 90°;
   v. the angle between said first cutting edge and said fourth cutting edge being about 90°;
   w. the angle between said second cutting edge and said third cutting edge being about 90°;
   x. said third cutting edge and said fourth cutting edge forming a second junction;
   y. said first junction and said second junction being spaced apart;
   z. said first cutting edge, said second cutting edge, and said first junction: being movable in said first recess for severing said strip material; and,
   aa. said third cutting edge, said fourth cutting edge, and said second junction being movable in said second recess for severing said strip material.

2. A machine for processing strip material to a desired length and the ends of the strip material to desired angles to realize processed strip material, said machine comprising:
   a. a severing means;
   b. a length positioning means for positioning said strip material with respect to said severing machine for processing said strip material to said desired length;
   c. an angle positioning means for positioning said strip material with respect to said severing machine for processing the ends of said strip material to desired angles; and,
   d. said severing machine and said strip material being rotatable with respect to each other to form said strip material into said processed strip material.
   e. said plunger having a guide means and a cutting edge for moving in said recess;
   f. said plunger being longer than said cutting edge so that said cutting edge is recessed with respect to said plunger; and,
   g. said plunger can be in said recess and said cutting edge can be positioned apart from said die with sufficient clearance between said die and said cutting edge to allow said strip material to be placed between said plunger and said cutting edge.
   h. said die in a cross-sectional view presenting a recess with a first side, a second side, a third side, and a fourth side;
   i. the angle between said first side and said second side being about 90°;
   j. the angle between said third side and said fourth side being about 90°;
   k. the angle between said first side and said fourth side being about 90°;
   l. the angle between said second side and said third side being about 90°;
   m. said die having a first cutting edge, a second cutting edge, a third cutting edge, and a fourth cutting edge;
   n. the angle between said first cutting edge and said second cutting edge being about 90°;
   o. the angle between said third cutting edge and said fourth cutting edge being about 90°;
   p. the angle between said first cutting edge and said fourth cutting edge being about 90°;
   q. the angle between said second cutting edge and said third cutting edge being about 90°;
   r. said first cutting edge, said second cutting edge, and said first junction: being movable in said first recess for severing said strip material; and,
   s. said third cutting edge, said fourth cutting edge, and said second junction being movable in said second recess for severing said strip material.

3. A machine according to claim 2 and comprising:
   a. said first cutting edge and said second cutting edge forming a first junction;
   b. said third cutting edge and said fourth cutting edge forming a second junction; and,
   c. said first junction and said second junction being spaced apart.

4. A machine according to claim 2 and comprising:
   aa. said first cutting edge and said fourth cutting edge meeting each other and being continuous; and,
   b. said second cutting edge and said third cutting edge meeting each other and being continuous.

5. A machine according to claim 2 and comprising:
   a. said first cutting edge, said second cutting edge, said third cutting edge, and said fourth cutting edge meeting each other and being continuous.

* * * * *